(12) United States Patent
Dirscherl et al.

(10) Patent No.: US 7,657,685 B2
(45) Date of Patent: Feb. 2, 2010

(54) CIRCUIT ARRANGEMENT AND METHOD FOR OPERATING A CIRCUIT ARRANGEMENT

(75) Inventors: Gerd Dirscherl, Munich (DE); Berndt Gammel, Markt-Schwaben (DE); Christian Peters, Vaterstetten (DE)

(73) Assignee: Infineon Technologies AG (DE)

( * ) Notice: Subject to any disclaimer, the term of this patent is extended or adjusted under 35 U.S.C. 154(b) by 296 days.

(21) Appl. No.: 11/745,916

(22) Filed: May 8, 2007

(65) Prior Publication Data

US 2007/0300001 A1 Dec. 27, 2007

(30) Foreign Application Priority Data

May 8, 2006 (DE) ................. 10 2006 021 389

(51) Int. Cl.
*G06F 13/00* (2006.01)
*G06F 15/00* (2006.01)
*G06F 15/76* (2006.01)

(52) U.S. Cl. ................... 710/301; 710/316; 712/29

(58) Field of Classification Search ............. 710/2, 710/8, 14, 107, 301–302, 305, 316; 455/558; 712/28–29
See application file for complete search history.

(56) References Cited

U.S. PATENT DOCUMENTS

| | | | | |
|---|---|---|---|---|
| 4,198,698 A | * | 4/1980 | Ong et al. ............. | 365/226 |
| 5,847,372 A | * | 12/1998 | Kreft .................... | 235/492 |
| 6,151,647 A | | 11/2000 | Sarat | |
| 6,272,601 B1 | * | 8/2001 | Nunez et al. .......... | 711/140 |
| 2002/0055979 A1 | * | 5/2002 | Koch et al. ........... | 709/212 |
| 2002/0103944 A1 | * | 8/2002 | Feuser et al. ......... | 710/2 |
| 2002/0120882 A1 | * | 8/2002 | Sarangi et al. ....... | 713/600 |
| 2004/0164170 A1 | * | 8/2004 | Krygier et al. ....... | 235/492 |
| 2007/0026894 A1 | * | 2/2007 | Zatloukal et al. .... | 455/558 |
| 2007/0158439 A1 | * | 7/2007 | Conner et al. ........ | 235/492 |
| 2007/0174642 A1 | * | 7/2007 | Cornwell et al. ..... | 713/300 |
| 2009/0043935 A1 | * | 2/2009 | Huomo et al. ........ | 710/301 |

FOREIGN PATENT DOCUMENTS

| | | |
|---|---|---|
| DE | 3935364 | 8/1990 |
| DE | 4406704 | 7/1995 |
| EP | 0 748 485 | 11/2001 |

* cited by examiner

*Primary Examiner*—Thomas J Cleary
(74) *Attorney, Agent, or Firm*—Dickstein, Shapiro, LLP.

(57) ABSTRACT

Circuit arrangement having a chip card controller with connections which can be used to access the chip card controller in accordance with the ISO standard and which are connected or can be connected to an ISO interface. The connections include at least one first connection, which can be connected to the ISO interface via a switch device. In addition, the circuit arrangement includes a further controller with at least one controller connection which is coupled to the switch device such that the first connection of the chip card controller can be connected to the controller connection via the switch device. The switch device can be switched between a first and a second state, where in the first state the first connection of the chip card controller is decoupled from the controller connection and is connected to the ISO interface, and where in the second state the first connection of the chip card controller is decoupled from the ISO interface and is connected to the controller connection.

42 Claims, 4 Drawing Sheets

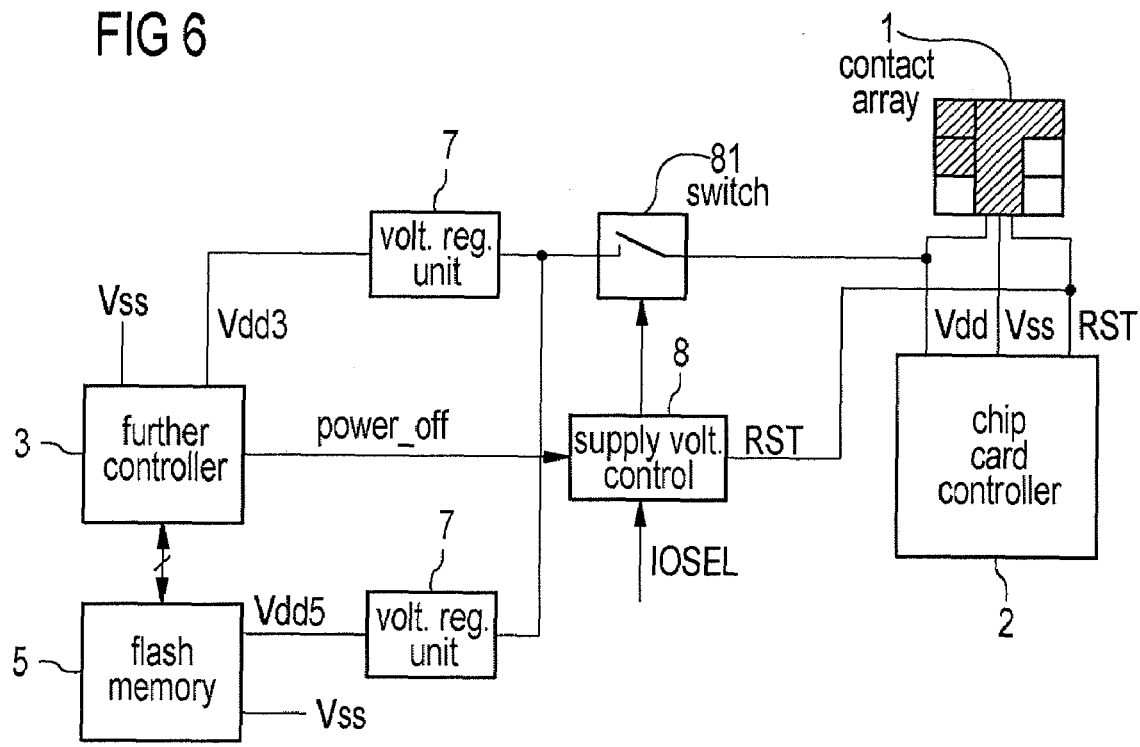
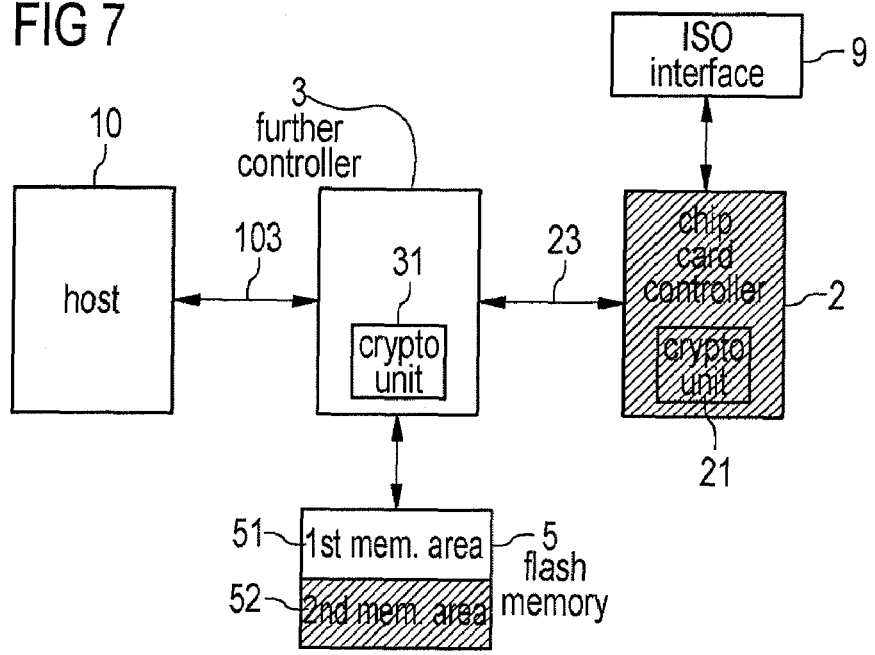

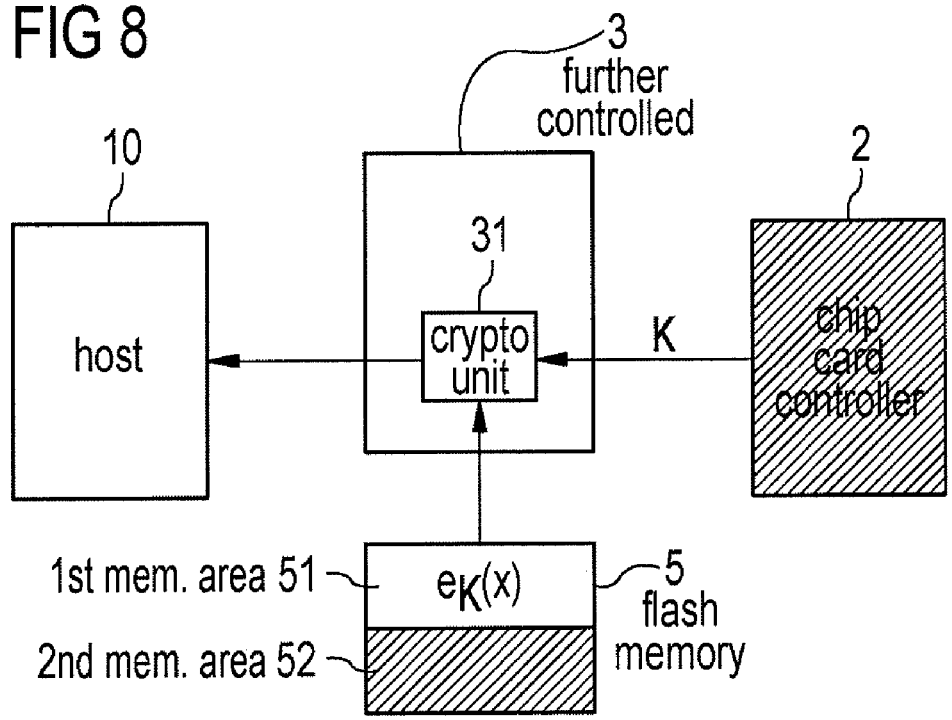
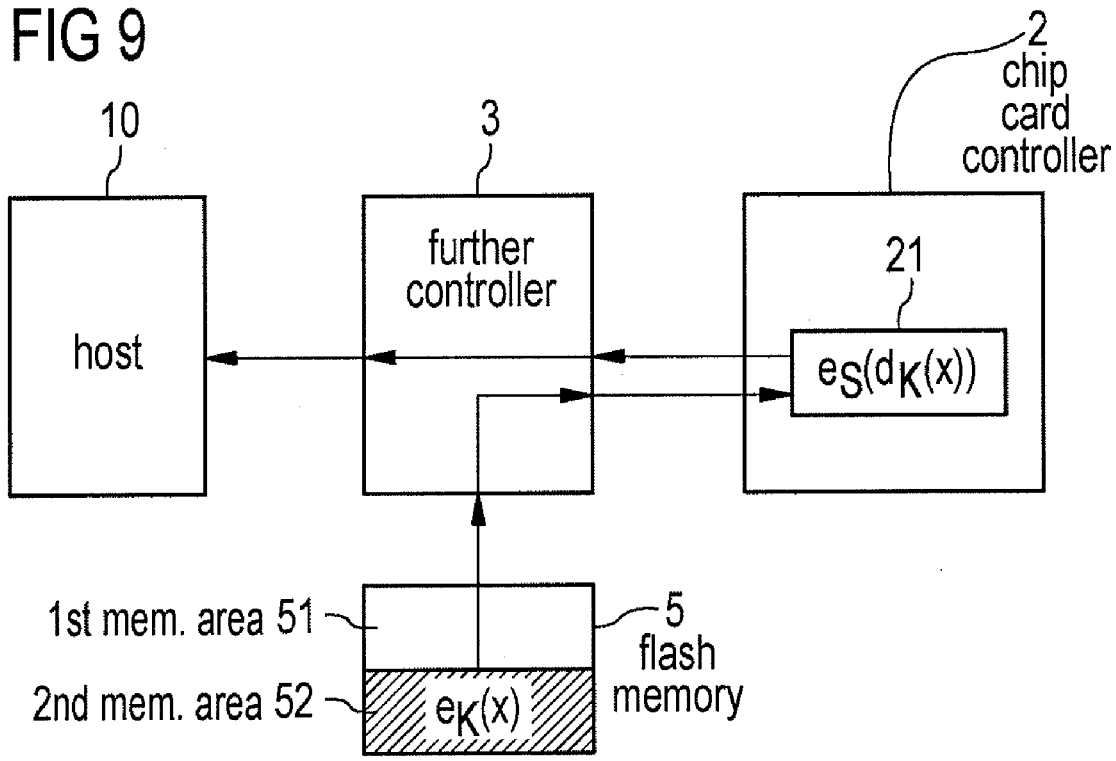

CIRCUIT ARRANGEMENT AND METHOD FOR OPERATING A CIRCUIT ARRANGEMENT

CROSS-REFERENCE TO RELATED APPLICATION

This application claims priority to German Patent Application Serial No. 102006021389.0, which was filed May 8, 2006, and is incorporated herein by reference in its entirety.

FIELD OF THE INVENTION

The invention relates to a circuit arrangement comprising a chip card controller and a further controller, with which the chip card controller can communicate, and also to a method for operating such a circuit arrangement.

BACKGROUND

Chip cards are used for a large number of applications. Examples of application are what are known as SIM cards, which are used in mobile telephones. In this case, the chip card is usually accessed by means of contact via a standardized ISO interface. In accordance with ISO standard 7816, five prescribed signals are associated with contact areas in a contact array. Provision is made for a supply potential, a reference potential, a reset potential, a clock signal and a data signal to be applied. The contact array usually has six or eight contact areas, so that further signals can optionally be applied. A chip card controller, with which it is possible to communicate in accordance with the ISO standard, has appropriate connections to which standardized signals are applied.

To increase the performance and functionality of chip cards, the chip card may be provided with further circuit blocks, for example memory units. These circuit blocks are accessed in conventional circuit arrangements via further interfaces which are provided in addition to the ISO interface. Since conventional SIM chip card controllers do not have further interfaces, a proprietary chip with a second interface is usually provided.

BRIEF DESCRIPTION OF THE DRAWINGS

The invention is explained below with reference to the drawing using embodiments.

FIG. 6 shows an embodiment to illustrate the power supply.

FIG. 7 shows a block diagram which illustrates an application of an embodiment of the circuit arrangement for cryptographic applications.

FIG. 8 shows the application of the embodiment shown in FIG. 7 for cryptographic applications with a low confidentiality classification.

FIG. 9 shows the application of the embodiment shown in FIG. 7 for cryptographic applications with a high confidentiality classification.

DETAILED DESCRIPTION

Figure 1:
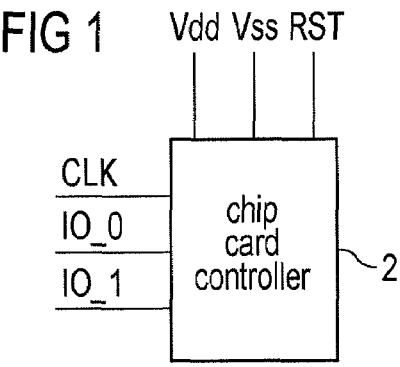
FIG. 1 shows a block diagram of an embodiment of a chip card controller.

FIG. 1 shows the block diagram of an embodiment of a chip card controller 2 with chip card controller connections Vdd, Vss, RST, CLK, IO_0 and IO_1. These connections allow communication with the chip card controller 2 in accordance with the ISO_7816 standard.

The text below explains the assignment of the chip card controller connections Vdd, Vss, RST, CLK, IO_0 and IO_1, comprising a supply potential connection Vdd, a reference potential connection Vss, a reset connection RST, a clock connection and a first and a second data connection IO_0, IO_1.

The supply potential connection Vdd and the reference potential connection Vss are used to apply a supply voltage for the chip card controller 2.

To reset the chip card controller 2, a reset signal is applied to the reset connection RST, so that the chip card controller 2 is put into a prescribed starting state.

A signal for clocking the chip card controller 2 is applied to the clock connection CLK.

The first data connection IO_0 provides bidirectional data transmission from and to the chip card controller 2.

The aforementioned chip card controller connections Vdd, Vss, RST, CLK, IO_0 allow communication in accordance with the ISO standard.

In addition, the second data IO_1 is provided, whose use is optional. In the ISO standard, the assignment of this connection is also called "Vpp". This connection can be used for data transmission, for example.

Figure 2:
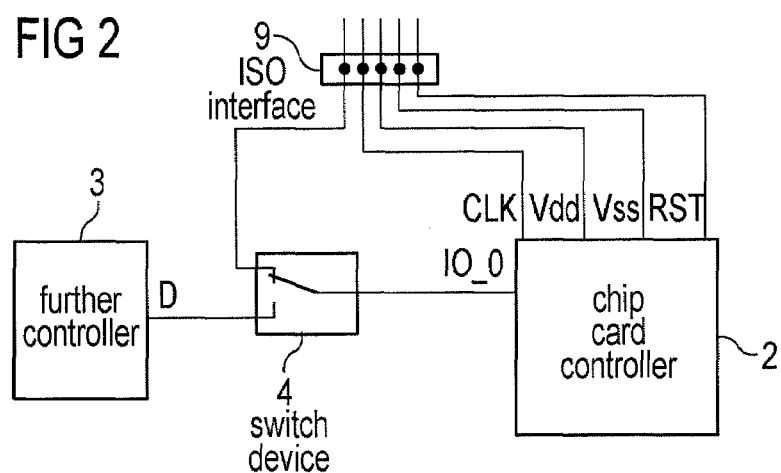
FIG. 2 shows an embodiment of a circuit arrangement.

FIG. 2 shows an embodiment which comprises a chip card controller 2 with connections Vdd, Vss, RST, CLK, IO_0. The connections Vdd, Vss, RST, CLK, IO_0 can be used to access the chip card controller 2 in accordance with ISO standard. The connections are connected or can be connected to an ISO interface 9. The connections Vdd, Vss, RST, CLK, IO_0 comprise at least one first connection IO_0 which can be connected to the ISO interface 9 by means of a switch device 4.

In addition, the circuit arrangement comprises a further controller 3 with at least one controller connection D which is coupled to the switch device 4 such that the first connection IO_0 of the chip card controller 2 can be connected to the controller connection by means of the switch device 4. The switch device 4 can be switched between a first and a second state. In the first state the first connection IO_0 of the chip card controller 2 is decoupled from the controller connection D and is connected to the ISO interface 9, and in the second state the first connection IO_0 of the chip card controller 2 is decoupled from the ISO interface 9 and is connected to the controller connection D.

In one embodiment, the chip card controller comprises more than one first connection.

The ISO interface 9 is used to access both the further controller 3 and the chip card controller 2, so that only one interface 9 is required. To access the further controller 3, the first connection or the first connections of the chip card controller 2 are decoupled from the ISO interface 9 and are connected to controller contacts D of the further controller 3. Following conclusion of the access, the first connection or the first connections are looped back again and data which have been transmitted from the further controller 3 to the chip card controller 2 in the course of the access can be output via the ISO interface 9.

In one embodiment, the data transmission between the chip card controller 2 and the further controller 3 in the second state of the switch device is effected via a first connection IO_0 which is in the form of a data connection for data transmission in accordance with the ISO standard and which is conductively connected to a data controller connection D. This transmission link can be used to transmit data bidirectionally.

A method for operating the circuit arrangement comprising a chip card controller and a further controller, where the chip card controller has connections which can be used to access the chip card controller in accordance with the ISO standard and the connections are connected or can be connected to an ISO interface, provides for the circuit arrangement to be switched between a first and a second operating state. The switch to the first operating state involves decoupling at least one first connection from the connections of the chip card controller from a controller connection over the further controller and connecting it to the ISO interface. The switch to the second operating state involves decoupling the at least one first connection of the chip card controller from the ISO interface and connecting it to the controller connection.

The switch allows the chip card controller and the further controller to be accessed via the same interface, since the chip card controller communicates with the further controller.

In one embodiment, the communication is controlled by the chip card controller in order to react to external requests via the ISO interface.

In one embodiment, in the second operating state the communication takes place bidirectionally via a data transmission link, following the example of the ISO protocol.

One embodiment of the method involves the further controller accessing a flash memory unit or an interface in the course of communication in order to expand the range of application of the chip card through such units.

Figure 3:
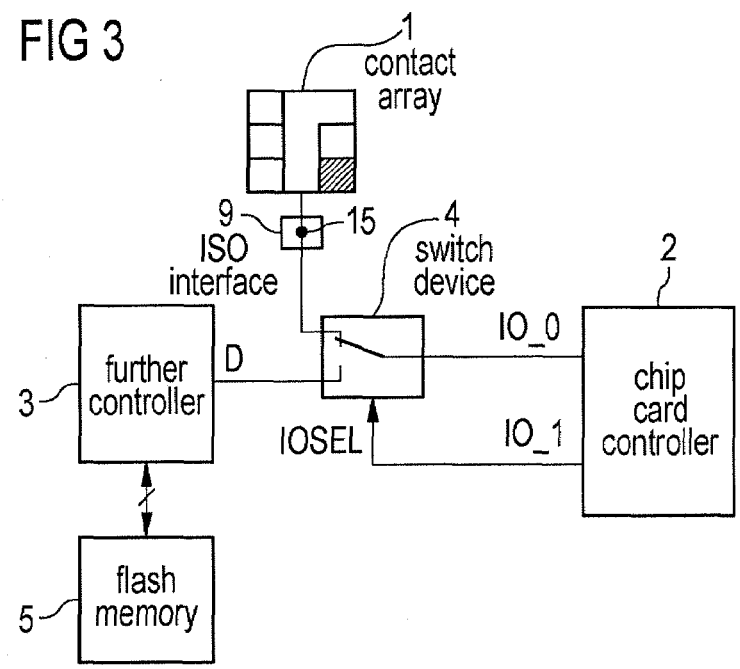
FIG. 3 shows an embodiment to illustrate the data transfer.

FIG. 3 shows a block diagram of an embodiment of the circuit arrangement which illustrates the data transmission between the chip card controller 2 and a further controller 3. The block diagram concentrates on fundamental elements for data transmission.

The circuit arrangement comprises the chip card controller 2, with the first data connection IO_0 and the second data connection IO_1. External access to the chip controller 2 is effected via an ISO interface 9. The first data connection IO_0 is coupled to a contact 15 of the ISO interface 9 by means of a switch device 4 such that the first data connection IO_0 can be connected to the contact 15 of the ISO interface 9. This contact 15 is coupled to a contact array 1 which allows the communication with the chip card controller 2 in accordance with the ISO standard. The card contact of the contact array 1, with which contact is made for the purpose of data transmission, is shown with shading.

The circuit arrangement comprises a further controller 3, which is coupled to a flash memory 5, so that the further controller 3 can access data in the flash memory 5.

The further controller 3 has a controller connection D which is coupled to the switch device 4. The switch device 4 can be used to couple the first data connection IO_0 of the chip card controller 2 either to the contact 15 or to the controller connection D. In this way, it is possible to change over between data transmission with a terminal (not shown) via the contact array 1 and data transmission with the further controller 3.

To change over the switch device 4, a control signal IOSEL is provided on a further connection IO_1 of the chip card controller 2 in order to signal the switch. This is done using the second data connection IO_1, which is provided for an optional signal and on which the chip card controller provides the switch signal.

The switch is effected on the basis of the control signal IOSEL, which can assume a first or a second state. By way of example, the first state may be a logic zero, and the second state may be a logic one, for example. When the control signal IOSEL changes to the first state, the switch device 4 is put into a first state. In this state, the first data connection IO_0 is conductively connected to the contact 15. The controller connection D of the further controller 3 is decoupled from the data connection IO_0. In the first state of the switch device 4, data transmission between the chip card controller 2 and the terminal via the contact array 1 is possible.

If, in the course of access by the terminal to the chip card controller 2 via the contact array 1, data are requested from the flash memory 5, for example, then the flash memory 5 is accessed via the same contact array 1. To execute this request, the switch device 4 is switched to the second state. To this end, the control signal IOSEL provided by the chip card controller 2 is put into the second state. This switches the switch device 4. As a result, the first data connection IO_0 is decoupled from the contact 15 and is conductively connected to the controller connection D of the further controller 3. The connection which has been set up between the first data connection IO_0 and the controller connection D is used by the chip card controller 2 to access the flash memory 5 via the further controller 3, for example in order to read data or to write data to the flash memory 5. When the switch device 4 has switched to the first state again, the data which have been read from the flash memory 5 are transmitted to the terminal via the contact array 1.

In one embodiment, the further controller 3 is used to actuate other or additional units, for example a further interface, via which communication takes place on the basis of another protocol. Such an interface may be in the form of a USB interface, for example.

In one embodiment, the further controller actuates a flash memory unit and a further interface for communication on the basis of another standard.

Figure 4:
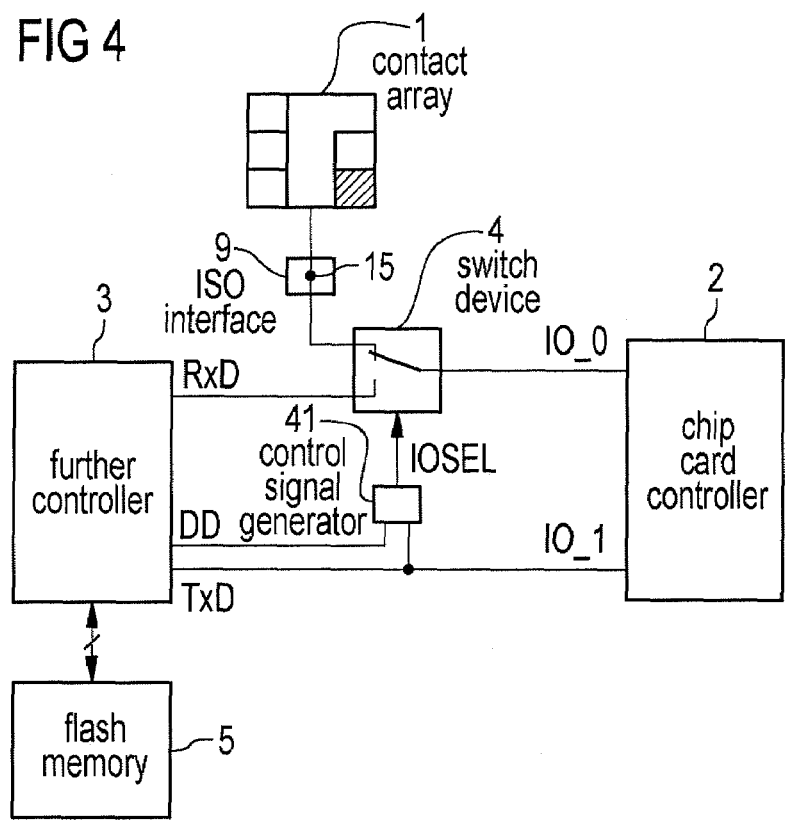
FIG. 4 shows a further embodiment to illustrate the data transfer.

FIG. 4 shows another embodiment which illustrates the data communication between the chip card controller 2 and the further controller 3.

Identical reference symbols indicate identical parts of the arrangement. To avoid repetition, matching arrangement features are not described more than once.

The embodiment in FIG. 4 differs from the embodiment described previously in FIG. 3 in that a control signal generator 41 is provided. This provides the control signal IOSEL for actuating the switch device 4.

The further controller 3 has a first data controller connection RxD and a second data controller connection TxD and a further connection DD. The first data controller connection RxD is coupled to the switch device 4. The second data controller connection TxD is coupled to the second data connection IO_1 of the chip card controller 2 and to the control signal generator 41. The further connection DD of the further controller 3 is likewise coupled to the control signal generator 41.

The first data connection IO_0 and the second data connection IO_1 are respectively used to produce a transmission link, so that the transmission capacity is increased in comparison with the preceding embodiment. In one embodiment, the communication via the transmission links takes place unidirectionally in each case.

In the first state of the switch device 4, the chip card controller 2 is coupled to the contact 15. In the second state of the switch device 4, the first data connection IO_0 is coupled to the first data controller connection RxD, so that a first transmission link is provided between the chip card controller 2 and the further controller 3. A connection between the second data controller connection TxD and the second data connection IO_1 provides a second transmission link. The first and the second transmission link are respectively used for unidirectional transmission. By way of example, the transmission from the chip card controller 2 to the further controller 3 takes place via the first data connection IO_0, and the transmission from the further controller 3 to the chip card controller 2 takes place via the second data connection IO_1.

Since a conventional chip card controller 2 which can be operated on the basis of the ISO standard has no further connections available, the switch is likewise signaled via the further connection IO_1 of the chip card controller. The chip card controller 2 signals the switch by setting a state on the connection IO_1. In one embodiment, the signaling takes place via one of the other connections of the chip card controller 2.

The control signal IOSEL is not generated by the chip card controller 2 directly but rather by the control signal generator 41. The latter is switched on the basis of a signal which is provided on the further connection DD of the further controller 3.

The communication is initiated and controlled by the chip card controller 2. The switch is signaled to the further controller 3 by means of the second data connection IO_1. Depending on whether a first or a second state has been set on this connection IO_1, either data are transmitted to the further connection or the switch device is signaled to change over. The second data connection IO_1, which is usually in the form of an "open connector", may have a first state, for example logic 0, or a second state, for example logic 1. For reception, the second data connection IO_1 has the second state and is at logic 1. The chip card controller 2 can receive data via the second transmission link. The data transmitted via this second transmission link by the further controller 3 do not influence the control signal IOSEL. If the chip card controller sets the second data connection IO_1 to logic 1 while the further controller 3 transmits a logic 0 to the control signal generator 41, the switch device 4 is switched.

Figure 5:
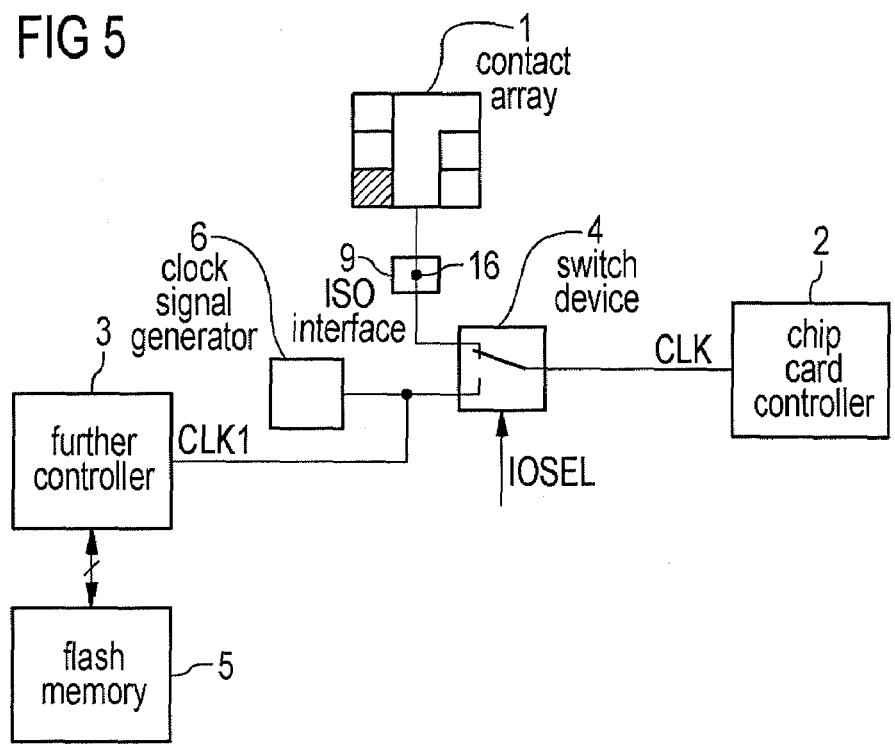
FIG. 5 shows an embodiment to illustrate the clocking.

In addition, embodiments comprise clocking and a power supply, the features of which are explained in the subsequent block diagrams in FIGS. 5 and 6.

FIG. 5 uses a block diagram to illustrate the clocking in an embodiment of the circuit arrangement. In one embodiment, the clocking can be used to carry out the data transmission on the basis of one of the previously explained embodiments.

When the chip card controller 2 communicates with the further controller 3, a clock connection CLK of the chip card controller 2 for applying an external clock signal based on the ISO standard is also decoupled from the ISO interface in a second state of the switch device. For the change to the second state, the clock connection CLK is coupled to a clock signal generator 6 or to a connection for applying a further clock signal. The communication inside the chip card can therefore be operated at a higher clock rate than the communication via the ISO interface at the externally prescribed clock rate. This is illustrated below with reference to the embodiment.

A clock connection CLK of the chip card controller 2 is coupled to a contact 16 via the switch device 4. This is a clock signal contact 16 which is connected to the relevant contact area of the contact array 1, so that this can be used by the terminal to apply an external clock signal via the ISO interface 9.

In addition, a clock signal generator 6 is provided which may be in the form of a VCO. The clock signal generator 6 provides an internal clock signal and is coupled to the switch device 4 and to a clock connection CLK1 of the further controller 3.

In the first state of the switch device 4, the clock connection CLK is coupled to the contact 16, so that the chip card controller 2 is operated at the external clock rate. In the second operating state, an internal clock signal is coupled to the chip card controller 2, which internal clock signal is also coupled to the further controller 3. This means that data can be transmitted internally at a higher transmission speed than externally via the ISO interface 9. When the switch device 4 has switched to the second state, the clock connection CLK is decoupled from the contact 16 and is conductively coupled to the clock signal generator 6. The chip card controller 2 and the further controller 3 are therefore operated at the internal clock rate, just like the communication. The internal clock rate, provided by the clock signal generator 6, may be higher than the external clock rate.

In one embodiment, instead of the clock signal generator 6 a connection for applying a further external clock is provided which has the clock connection CLK coupled to it in the second state of the switch device 4. This further external clock can be provided via a further interface, for example.

The text below discusses the power supply. For supplying power, one embodiment involves the further controller being connected to the power supply for the chip card controller.

Provision is made for the controller to be supplied with power only when needed in order to allow energy-saving operation of the circuit arrangement. A controller supply voltage is coupled to the further controller and to the flash memory, which is coupled to that in one embodiment, only when needed in order to save power. For this purpose, a supply voltage controller is provided which is coupled to the control signal such that the change to the first state of the switch device prompts a controller supply voltage to be provided for the further controller. To prevent data which still need to be stored by the further controller, for example, from being lost after the end of access by the chip card controller, one embodiment involves the termination of the controller supply voltage being initiated by the further controller. In one embodiment, the supply voltage is decoupled only when the further controller signals that its internal processing has ended. This practice prevents data losses in the further controller when, following the communication with the chip card controller, there are still actions awaiting for the further controller, for example the storage of data.

In one embodiment, provision is made for power to be supplied for the further controller, and units coupled thereto, by adjusting the controller supply voltage in order to observe a prescribed current limit. To this end, one embodiment of the supply voltage control has a voltage regulator provided for adjusting the controller supply voltage. This allows prescribed current limits to be observed, for example.

FIG. 6 uses a block diagram to show the power supply in an embodiment of the circuit arrangement.

The chip card controller 2 is supplied with power via a supply potential connection Vdd and a reference potential connection Vss, between which it is possible for the terminal to apply an external supply voltage via the contact array 1.

The further controller 3 and the flash memory 5 have supply potential connections and reference potential connections Vdd3, Vdd5 for applying an internal supply voltage.

A supply voltage control 8 is provided in order to couple the supply potential connection Vdd of the chip card controller 2 via a switch 81 to the supply potential connections of the further controller 3 and of the flash memory 5.

Provided between the switch 81 and the supply potential connections of the further controller 3 and of the flash memory 5 is a respective voltage regulation unit 7 which can be used to adjust the supply voltage for the further controller 3 and for the flash memory 5. Such adjustment is expedient, for example, in order to observe certain demands on the current limit.

When the chip card controller 2 accesses the further controller 3, the control signal IOSEL which is coupled to the supply voltage control 8 closes the switch 81, so that the further controller 3 and the flash memory 5 are supplied with power when the switch device 4 is switched to the second state. The power supply is maintained during the communication between the further controller 3 and the chip card controller.

When the chip card controller 2 has finished access, the control signal IOSEL can signal to the supply voltage control 8 to open the switch 81 and to interrupt the power supply for the further controller 3 and the flash memory 5. However, this practice requires the further controller 3 also to conclude the access action if appropriate after the end of communication, for example in order to avoid a loss of data. For this reason, one embodiment involves waiting until data transmitted by the chip card controller 2 have been written to the flash memory 5, for example.

A supply voltage control signal power_off which is provided by the further controller 3 signals the end of the access actions to the supply voltage control 8. The switch 81 is opened. The supply voltage control 8 closes the switch 81 on the basis of the control signal IOSEL and opens the switch 81 on the basis of the supply voltage control signal power_off.

In addition, the circuit arrangement in FIG. 6 has a reset connection RST on the chip card controller 2, which is coupled to the contact array 1 and via which it is possible to apply a reset signal from the terminal. The supply voltage control device 8 also has a reset connection RST which is coupled to that of the chip card controller 2.

To put the circuit arrangement together with the supply voltage control 8 into a defined starting state, a reset signal is applied by the terminal.

The circuit arrangement described above may, at least in part, be in integrated form. Particularly the controllers 3, 5 and the switch unit 4 and also possibly the power supply 8, 81 can be integrated in a chip.

FIG. 7 shows an example of application in order to use the described arrangement for encrypting and decrypting stored data.

In this embodiment, circuit arrangements are used in order for data stored within the flash to be decrypted or encrypted by the chip card controller or by the further controller. For this purpose, a cryptographic unit is provided.

The block diagram in FIG. 7 shows the interface 9 via which the terminal access to the chip card controller 2 takes place. A data transmission link 23 is provided between the chip card controller 2 and the further controller. This data transmission can take place in the manner described in FIG. 3 or 4. The further controller 3 can access to the flash memory 5, which comprises a first memory area 51 and a second memory 52. The first memory area 51 is provided for non-sensitive data. The second memory area 52 is provided for sensitive data. A further interface 103 couples a host 10 to the further controller 3, to which and from which data are transmitted. The form of the host 10 and of the interface 103 can be widely different. By way of example, the host 10 may communicate via a USB interface or an MCC interface. For decrypting and encrypting data, both the further controller 3 and chip card controller 2 contain cryptographic units 31 and 21.

FIG. 8 shows the access to the flash memory 5 with the aid of an embodiment with a low security classification.

A key K stored in the chip card controller 2 is transmitted from the chip card controller 2 to the further controller 3. It is also conceivable for the key K to have been transmitted from the terminal to the chip card controller 2 beforehand. Data $e_K(x)$ which are stored and encrypted in the flash memory 5 are transmitted to the further controller 3 and are decrypted in the cryptographic unit 31 of the further controller 3 using the provided key K. The decrypted data are transmitted to the host 10.

Data transmitted from the host 10 to the further controller 3 can be encrypted in the latter's cryptographic unit 31 using the key K provided by the chip card controller 2 and can then be stored in the first memory area 51 of the flash memory 5.

The encryption described above is symmetric encryption, where the same key is used for the encryption and the corresponding decryption.

FIG. 9 shows an application example with a higher security level, where the key K is not issued by the chip card controller 2.

The encrypted data $e_K(x)$ are stored in a second memory area 52 of the flash memory 52. For the purpose of securely transmitting these data to the host 10, with the data $e_K(x)$ first of all transmitted to the further controller 3 in encrypted form, from where they are transmitted to the chip card controller 2. This method has no provision for the key K to be issued by the chip card controller 2. Therefore, the decryption of the data, illustrated as $d_K(x)$, takes place in a cryptographic unit 21 of the chip card controller 2. For security reasons, the decrypted data $e_K(x)$ are encrypted again, illustrated as $e_s(d_K(x))$, using a different key S before being issued to the host 10. These data are issued to the host 10, where they can be decrypted, via the further controller 3.

What is claimed is:

1. A circuit arrangement comprising:
   a chip card controller comprising connections configured to be compliant with a chip card ISO standard;
   a switch device which can couple a first connection of the connections of the chip card controller with a chip card ISO standard compliant interface; and
   a further controller comprising a controller connection which is coupled to the switch device such that the first connection of the chip card controller can be coupled to the controller connection via the switch device,
   wherein the switch device can be switched between a first and a second state, where in the first state the first connection of the chip card controller is coupled to the chip card ISO standard compliant interface, and in the second state the first connection of the chip card controller is coupled to the controller connection.

2. The circuit arrangement as claimed in claim 1, wherein the chip card comprises a further connection, which is coupled to the switch device and is configured to provide a control signal in order to change the state of the switch device.

3. The circuit arrangement as claimed in claim 1, wherein the first connection comprises a data connection which, in the second state, is connected to a first data controller connection of the further controller.

4. The circuit arrangement as claimed in claim 1, further comprising a clock signal generator which, in the second state, applies an internal clock signal to the first connection of the chip card controller which is in the form of a clock connection.

5. The circuit arrangement as claimed in claim 1, further comprising a supply voltage control configured to provide a controller supply voltage, where the supply voltage control is coupled to the further controller and to a supply potential connection of the chip card controller, to which a supply potential can be applied in accordance with the chip card ISO standard.

6. The circuit arrangement as claimed in claim 5, wherein the controller supply voltage is applied to the further controller when the switch device switches to the second state.

7. The circuit arrangement as claimed in claim 5, wherein the further controller provides a supply voltage control signal which is coupled to the supply voltage control, so that following conclusion of an access action the controller supply voltage is decoupled from the further controller.

8. The circuit arrangement as claimed in claim 5, wherein the controller supply voltage is adjustable.

9. The circuit arrangement as claimed in claim 5, further comprising a first voltage regulation unit, which is provided between the further controller and the supply potential connection of the chip card controller, and is configured to adjust the supply potential for the further controller.

10. The circuit arrangement as claimed in claim 9, wherein the further controller actuates a flash memory unit.

11. The circuit arrangement as claimed in claim 10, further comprising a second voltage regulation unit, which is provided between the flash memory unit and the supply potential connection of the chip card controller, and is configured to adjust the supply potential for the flash memory unit.

12. The circuit arrangement as claimed in claim 1, wherein the further controller actuates a flash memory unit.

13. The circuit arrangement as claimed in claim 1, wherein the further controller actuates an interface.

14. A circuit arrangement comprising:
   a chip card controller comprising a first connection and second connections configured to be compliant with a chip card ISO standard;
   a chip card ISO standard compliant interface which is electrically conductively coupled to the second connections;
   a switch device which can couple the first connection of the chip card controller to the chip card ISO standard compliant interface; and
   a further controller comprising a controller connection coupled to the switch device,
   wherein the switch device can be switched between a first and a second state, where in the first state the first connection of the chip card controller is electrically conductively coupled to the chip card ISO standard compliant interface, and where in the second state the first connection of the chip card controller is electrically conductively coupled to the controller connection.

15. The circuit arrangement as claimed in claim 14, further comprising a control signal generator configured to provide a control signal which is coupled to the switch device in order to switch the switch device.

16. The circuit arrangement as claimed in claim 15, wherein the chip card controller has a further connection which is coupled to the switch device and can be set in a first or a second state, and in a first state the switch device position can be switched.

17. The circuit arrangement as claimed in claim 16, wherein the further connection of the chip card controller is coupled to a second data controller connection of the further controller, so that in the second state of the further connection data can be transmitted.

18. The circuit arrangement as claimed in claim 15, wherein the further controller is coupled to the control signal generator.

19. The circuit arrangement as claimed in claim 14, wherein in the second state a first connection of the chip card controller which is in a form of a data connection is connected to a first data controller connection of the further controller.

20. The circuit arrangement as claimed in claim 14, further comprising a clock signal generator which, in the second state, applies an internal clock signal to the first connection of the chip card controller which is in the form of a clock connection and to a clock connection of the further controller.

21. The circuit arrangement as claimed in claim 14, further comprising a supply voltage control configured to provide a controller supply voltage, where the supply voltage control is coupled to the further controller and to a supply potential connection of the chip card controller, to which a supply potential can be applied in accordance with the chip card ISO standard.

22. The circuit arrangement as claimed in claim 21, wherein the controller supply voltage is applied to the further controller when the switch device switches to the second state.

23. The circuit arrangement as claimed in claim 21, wherein the further controller provides a supply voltage control signal which is coupled to the supply voltage control, so that following conclusion of access actions the controller supply voltage is decoupled from the further controller.

24. The circuit arrangement as claimed in claim 21, wherein the controller supply voltage is adjustable.

25. A method for operating a circuit arrangement comprising a chip card controller and a further controller, wherein the chip card controller has connections configured to be compliant with a chip card ISO standard, and the connections can be coupled to a chip card ISO standard compliant interface, the method comprising:
   switching the circuit arrangement between a first and a second operating state,
   wherein the switch to the first operating state comprises decoupling a first connection from the connections of the chip card controller from a controller connection of the further controller, and connecting the first connection of the chip card controller to the chip card ISO standard compliant interface, and
   wherein the switch to the second operating state comprises decoupling the first connection of the chip card controller from the chip card ISO standard compliant interface, and coupling the first connection of the chip card controller to the controller connection.

26. The method as claimed in claim 25, wherein switches between the operating states takes place based on a control signal.

27. The method as claimed in claim 26, wherein the control signal is provided by the chip card controller.

28. The method as claimed in claim 25, wherein the switch between the operating states is initiated by the chip card controller.

29. The method as claimed in claim 28, wherein the initiation comprises setting a first state on a further connection of the chip card controller.

30. The method as claimed in claim 25, further comprising, in the first operating state, providing a data transmission link between the chip card controller and the further controller, wherein the link being used for data transmission.

31. The method as claimed in claim 25, wherein the switch to the second operating state comprises coupling an internal clock signal coupled to the further controller to a first connection of the chip card controller, which is in a form of a clock connection.

32. The method as claimed in claim 25, wherein the switch to the second operating state prompts a controller supply voltage to be applied to the further controller.

33. The method as claimed in claim 32, further comprising adjusting the controller supply voltage.

34. The method as claimed in claim 32, further comprising the further controller initiating decoupling of the controller supply voltage.

35. A method for operating a circuit arrangement comprising a chip card controller and a further controller, where the chip card controller comprises a first connection and second connections configured to be compliant with a chip card ISO standard, the second connections being coupled to a chip card ISO standard compliant interface, and the first connection capable of being coupled to the chip card ISO standard compliant interface, the method comprising:
  switching the circuit arrangement between a first and a second operating state,
  wherein the switch to the first operating state comprises electrically decoupling the first connection of the chip card controller from a controller connection of the further controller, and electrically coupling the first connection of the chip card controller to the chip card ISO standard compliant interface, and
  wherein the switch to the second operating state comprises electrically decoupling the first connection of the chip card controller from the chip card ISO standard compliant interface, and electrically coupling the first connection of the chip card controller to the controller connection.

36. The method as claimed in claim 35, wherein the chip card controller provides a control signal to switch between the operating states.

37. The method as claimed in claim 36, further comprising, in the first operating state, providing a data transmission link between the chip card controller and the further controller, said data transmission link being used for bidirectional data transmission.

38. The method as claimed in claim 35, further comprising:
  setting a further connection of the chip card controller to be in a first state; and
  switching by the further controller after the first state has been set.

39. The method as claimed in claim 38, further comprising, in the first operating state, providing two data transmission links between the chip card controller and the further controller, said data transmission links being used for respective unidirectional data transmission.

40. The method as claimed in claim 35, wherein the switch to the second operating state comprises coupling an internal clock signal coupled to the further controller to a first connection of the chip card controller, which is in the form of a clock connection.

41. The method as claimed in claim 35, wherein the switch to the second operating state prompts a controller supply voltage to be applied to the further controller.

42. The method as claimed in claim 41, wherein the further controller initiates decoupling of the controller supply voltage through the provision of a supply voltage control signal.

* * * * *